United States Patent [19]

Conley

[11] 4,286,530

[45] Sep. 1, 1981

[54] MULTIPLE ROW SEED PLANTER WITH COMMON SEED STORAGE

[76] Inventor: Richard L. Conley, Rte. 2, Box 210, Blytheville, Ark. 72315

[21] Appl. No.: 62,153

[22] Filed: Jul. 26, 1979

[51] Int. Cl.³ .......................... A01C 5/00; B60P 1/00
[52] U.S. Cl. ....................................... 111/1; 414/526
[58] Field of Search .................. 111/1, 10, 11, 12, 34, 111/63, 73, 85, 52; 198/530, 537, 312, 662, 362; 414/505, 504, 523, 526, 345, 512, 528, 531, 538; 193/21, 22, 30

[56] References Cited

U.S. PATENT DOCUMENTS

| 582,598 | 5/1897 | Bird | 193/22 |
|---|---|---|---|
| 734,292 | 7/1903 | Barnes | 198/530 |
| 1,148,674 | 8/1915 | Gray | 193/22 |
| 1,663,161 | 3/1928 | Faber | 193/22 |
| 1,899,931 | 3/1933 | Benjamin et al. | 111/63 |
| 2,042,014 | 5/1936 | Michael et al. | 111/73 |
| 2,115,199 | 4/1938 | Eriandson | 47/1.7 X |
| 2,319,588 | 5/1943 | Dreese | 414/523 |
| 2,751,097 | 6/1956 | Miller | 414/526 |
| 2,765,936 | 10/1956 | Phillips | 414/526 |
| 3,439,819 | 4/1969 | Quanbeck | 111/10 X |
| 3,841,243 | 10/1974 | Tye | 111/85 |

FOREIGN PATENT DOCUMENTS

| 702863 | 2/1965 | Canada | 193/22 |
|---|---|---|---|
| 2241969 | 3/1974 | Fed. Rep. of Germany | 198/530 |

*Primary Examiner*—James R. Feyrer
*Attorney, Agent, or Firm*—Harvey B. Jacobson

[57] ABSTRACT

A multiple row seed planter is disclosed having common seed storage with lines feeding individual planter hoppers. A receiving bin is mounted on the side of a truck near the top outside, and the bin receives grain or seed from the seed bed of the truck as delivered by a conventional auger inside the truck. Grain from the bin enters a telescoping pipe and controllably flows through the pipe to a common feed tank located on the planter. From the common feed tank, lines extend to each individual planter hopper. In operation, planting of grain crops is expedited and simplified. Fertilizer, as well as a variety of seed grains, can be dispersed with the invention.

9 Claims, 12 Drawing Figures

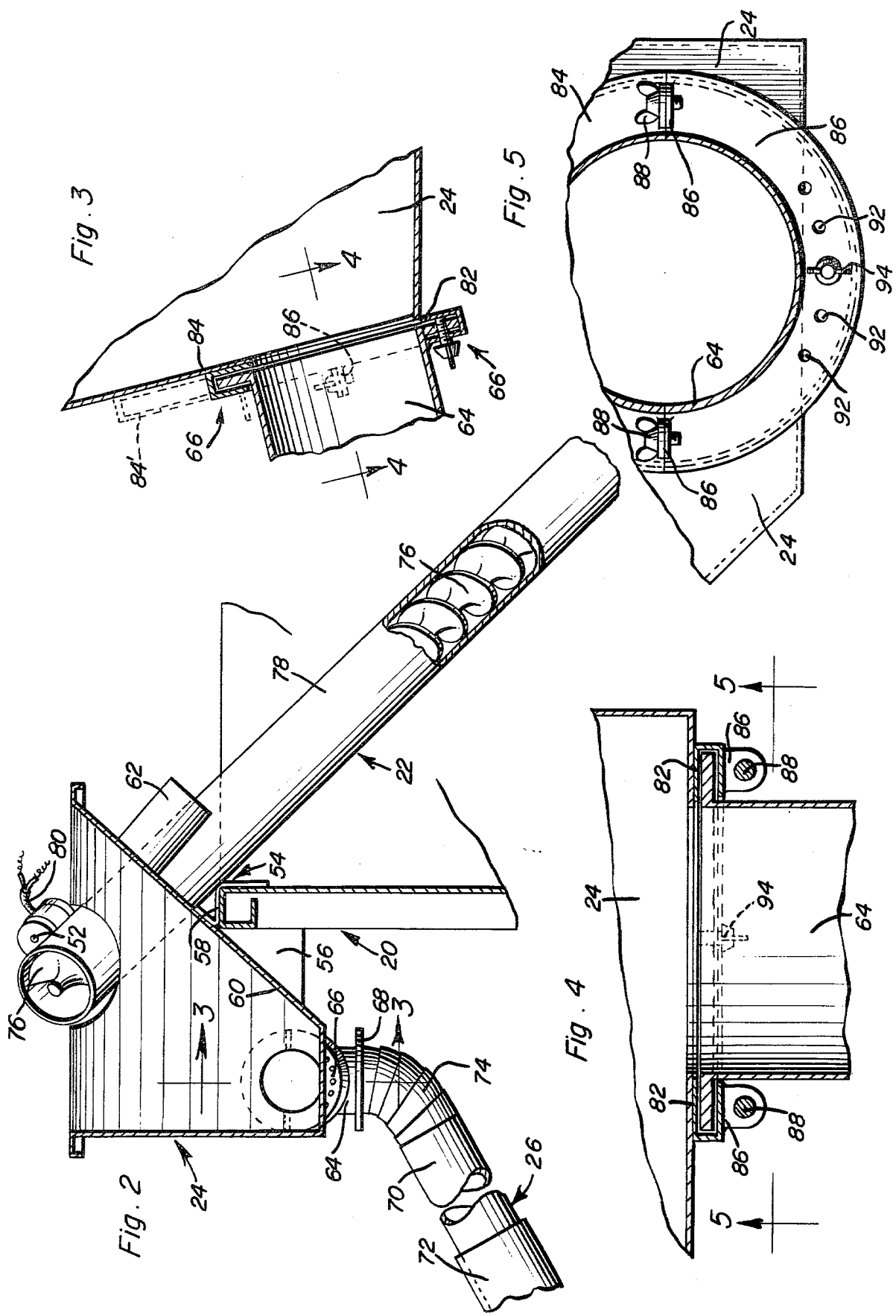

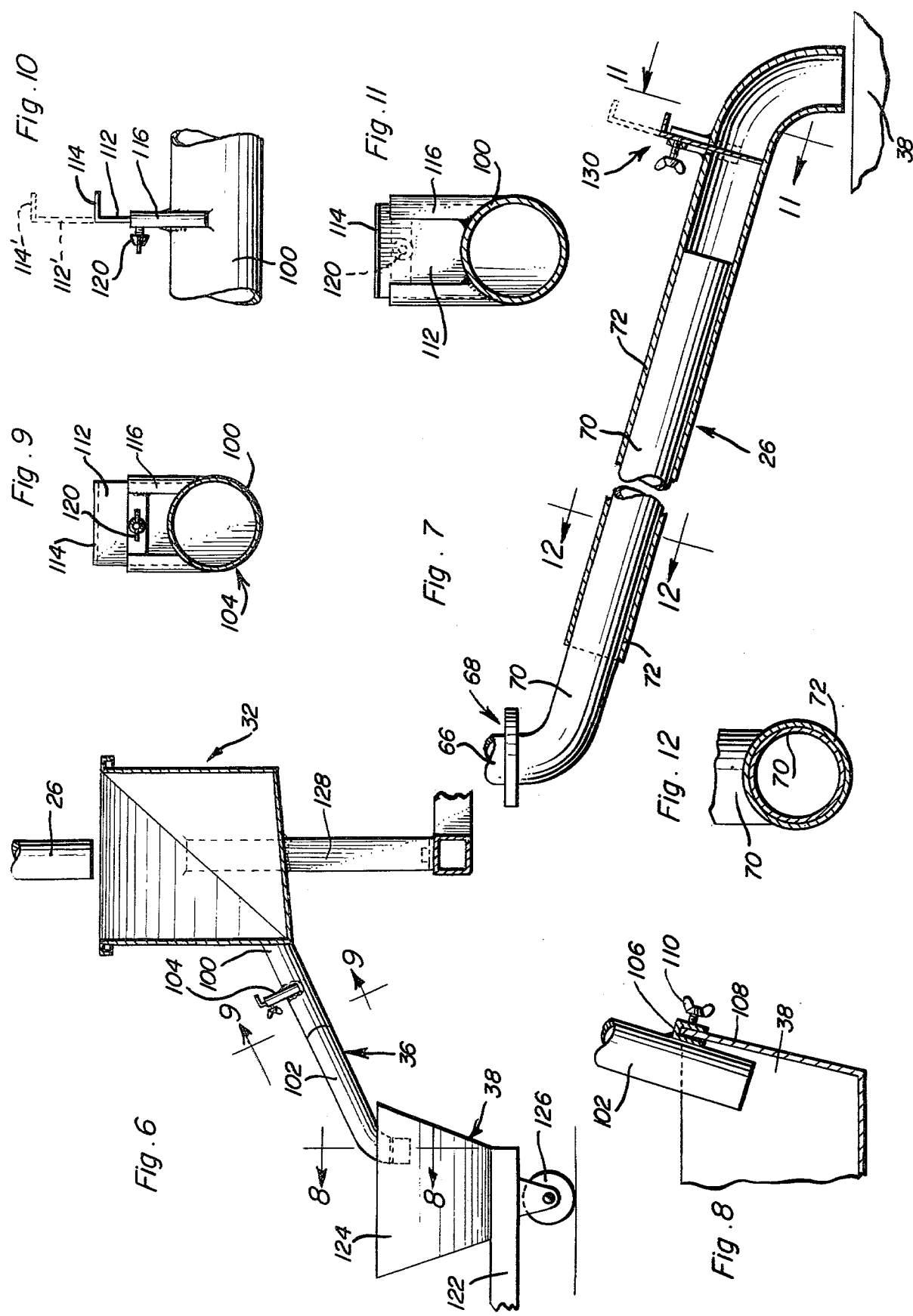

MULTIPLE ROW SEED PLANTER WITH COMMON SEED STORAGE

BACKGROUND OF THE INVENTION

1. Field of the invention

The invention relates to agricultural equipment for dispensing of grain seeds and granular fertilizer. More particularly, the invention contemplates an automatic loading device including a receiving bin located on the side of a truck holding the seeds or fertilizer, in combination with a telescoping pipe to a feed tank located on a separate seed planter. The feed tank on the planter feeds a plurality of planter hoppers for automatic loading of the hoppers, the rate of flow into the hoppers being controllable by flow control gates on the feed lines from the tank to hoppers.

2. Disclosure Statement

In U.S. Pat. No. 3,179,273, issued Apr. 20, 1965, to Barber et al, a transport vehicle and unloading conveyor are disclosed where a downspout with a flexible tubular portion and three telescoping sections is slidable for shortening or lengthening of the spout and discharging the vehicle contents, such as seed grain. However, seeds, such as beans, cannot be moved in a smooth manner from the grain bed of the Barber et al device into the seed hopper, and a high degree of complexity and complication characterizes the compartmented grain bed construction of the Barber et al patent. A further disadvantage is that modification of a conventional truck bed necessarily must be undertaken to accommodate utilizing the Barber et al invention.

Hansen et al, in U.S. Pat. No. 3,543,704, patented Dec. 1, 1970, disclose a tractor-drawn agricultural planter having a plurality of commonly driven units including seed dispensing means where a central seed hopper feeds individual seed dispensing means. However, the Hansen et al construction requires the seed reservoir to be tractor drawn, rather than tractor mounted, with consequent space requirements and incompatibility with conventional planters which are primarily tractor mounted at the present time. Further, the chain driven mechanism taught by Hansen et al requires considerable expense for construction, maintenance, and the possibility of breakdown can result in loss of time and expense, unlike a simpler arrangement, such as a gravity flow mechanism. A machine is disclosed in U.S. Pat. No. 1,556,850, issued Oct. 13, 1925, to Kuhne, which utilizes a spoon-like device for retaining a seed and ejecting it through an aperture, and then functioning as a grain drill, rather than a planter.

Other patents relating to the field of the invention include the following:

| | | |
|---|---|---|
| 1,899,931 | Benjamin et al | March 7, 1933 |
| 2,296,014 | Benzel, Sr. et al | Sept. 15, 1942 |
| 2,410,996 | Patterson | Nov. 12, 1946 |
| 4,002,252 | Beckman, Jr. | Jan. 11, 1977 |

SUMMARY OF THE INVENTION

The invention overcomes problems of inconvenience and expense associated with prior attempts to transport and load seeds, fertilizer and the like by providing a receiving bin mounted on the side of the grain bed, which in turn is mounted on a truck having an auger running from the receiving bin into the bed of the truck. Loose seeds carried in the truck can be augered into the receiving bin, and can then be dispensed by gravity through a telescoping pipe to a seed planter feed tank constituting common seed storage for a plurality of individual planter hoppers. The individual planter hoppers are fed by feed lines connected to the feed tank. A flexible control gate is located on each planter hopper to control the flow of seed and to insure that the planter hopper will not overrun during planting operations.

Accordingly, it is an important object of the invention to provide an automatic loading device for various grain seeds and granular fertilizers.

Another object is to provide a mobile storage device, such as a truck, with an attached receiving bin having a dispenser for transferring the truck contents to a planter seed tank. Still another object is to additionally combine the storage and feeding apparatus above with a seed planter having individual feed lines extending from the feed tank to individual planter hoppers having the advantage of automatic loading and flow control of seed or fertilizer.

Yet another object is to provide apparatus suitable for use with a plurality of grain types, such as soybeans, rice, corn, wheat, milo, other grain crops, and the like.

A further object is to provide a multiple row seed planter with common seed storage where the common seed storage feed tank is easily accessible through a telescoping feed pipe to a truck or equivalent dispensing means transportable to the general vicinity of planting.

Another further object is to provide seed planter feed lines connected in pairs to a pair of planter hoppers, each pair of feed lines having a common segment connected to the feed tank.

Still another further object is to provide a planter feed tank having compartmented storage, each compartment being suppliable conveniently and easily by a telescoping feed pipe device.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a section view of the receiving bin, mounted on the side of the truck, showing details of the upper portion of the auger and upper portion of the telescoping feed pipe connected to the receiving bin, taken substantially upon a plane passing along section line 2—2 of FIG. 1.

FIG. 3 is an enlarged fragmentary sectional view of the connection between the feed pipe and the receiving bin, taken substantially upon a plane passing along section line 3—3 on FIG. 2.

FIG. 4 is a further enlargement of the connection, taken substantially upon a plane passing along section line 4—4 on FIG. 3.

FIG. 5 is a section of the feed pipe in the direction of the receiving bin, taken substantially upon a plane passing along section line 5—5 on FIG. 4.

FIG. 6 is a sectional view of the seed planter portion of the combination of the present invention, taken substantially upon a plane passing along section line 6—6 on FIG. 1.

FIG. 7 is a sectional view of the telescoping feed pipe, taken substantially upon a plane passing along section line 7—7 on FIG. 1.

FIG. 8 is an enlarged view showing the mounting of the feed pipe to the planter feed tank, and is taken substantially upon a plane passing along section line 8—8 on FIG. 6.

FIG. 9 is a transverse sectional view of the feed pipe, taken substantially upon a plane passing along section line 9—9 on FIG. 6, and showing details of the flow control gate.

FIG. 10 is a fragmentary elevational view of the flow control gate.

FIG. 11 is a transverse sectional view of the telescoping feed pipe in the direction of the flow control gate, but in the opposite direction from FIG. 9, taken substantially upon a plane passing along section line 11—11 on FIG. 7.

FIG. 12 is a transverse sectional view of the telescoping feed pipe, taken in a direction toward the receiving bin, taken substantially upon a plane passing along section line 12—12 on FIG. 7.

DESCRIPTION OF THE PREFERRED EMBODIMENT

Figure 1:
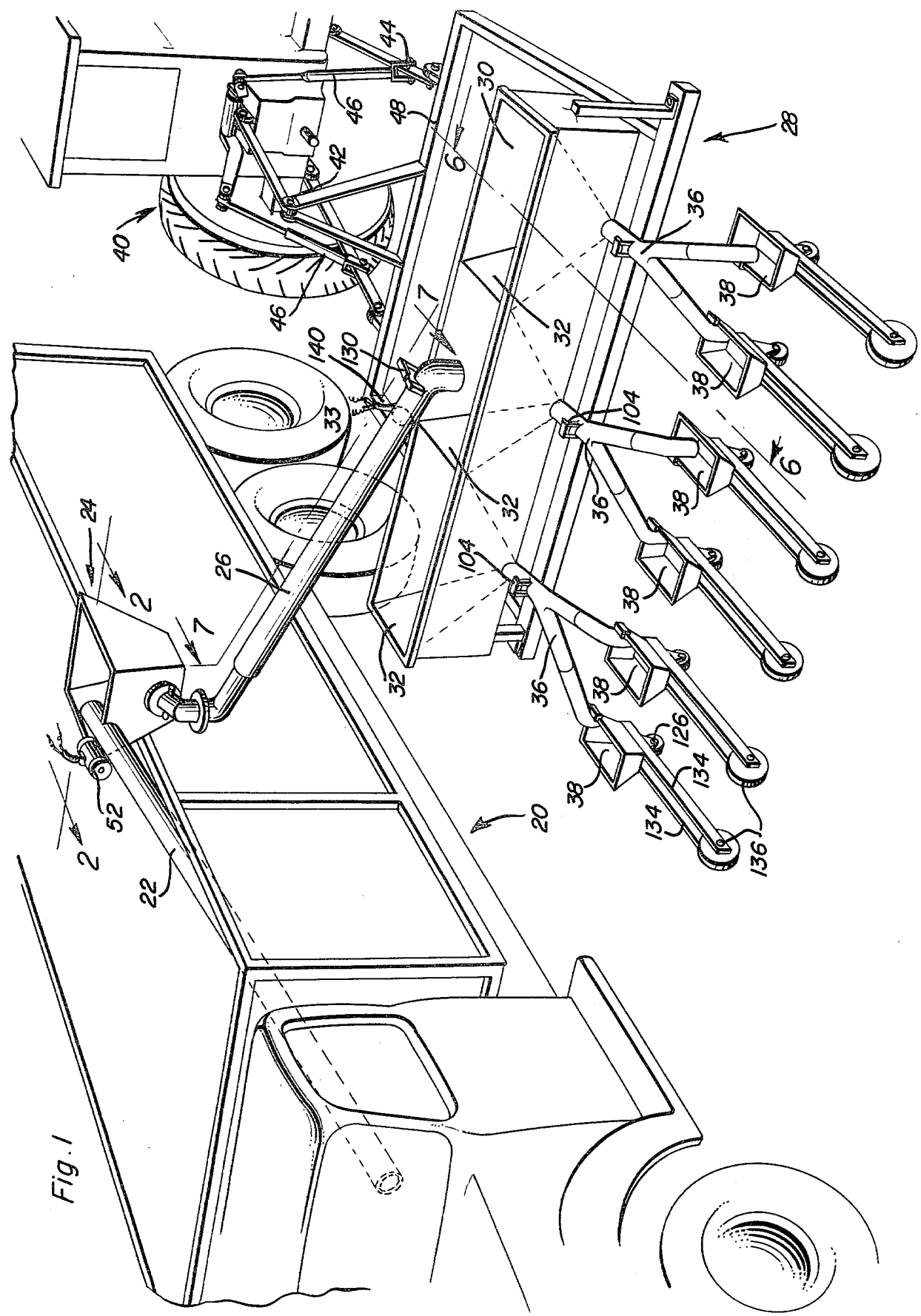
FIG. 1 is an overall perspective view of the multiple seed row planter in combination with a truck having a side mounted receiving bin with a telescoping feed pipe connecting the bin to the feed tank.

While many attempts have been made to provide seed planters or fertilizer dispensing devices with multiple row dispensing capability and common seed storage, none offers the advantages of the combination shown in FIG. 1 where truck 20 is provided with auger 22 to deliver the contents of the truck grain bed into receiving bin 24, which is connected by telescoping feed pipe 26 to planter assembly 28. Such a combination simplifies the planting of grain crops, in that refilling of feed tank 30 is expedited, particularly when feed tank 30 has multiple compartments 32, as shown in FIG. 1. Further, the combination shown therein is useful for planting or dispensing one of a plurality of materials, including seed grain of various types, such as soybeans, rice, corn, wheat, milo, and other grain crop seeds, as well as materials such as granular fertilizer, and the like. Planter 28 is characterized by feed lines 36, which can be rigid (as shown) or flexible, and are preferably Y-shaped, whereby each line emerging from feed tank 30 can service a pair of individual planter hoppers 38. Accordingly, planter 28 has the capability of multiple row seed planting, there being typically four hoppers 38, six hoppers 38, or eight hoppers 38, with the precise number depending upon the number of rows to be planted at one time, six being the number shown in FIG. 1 for illustrative purposes only. To further illustrate the scale of typical operation, without limiting the generality of the invention to the particular capacities disclosed, inasmuch as the invention is usable over a wide variety of sizes, shapes, and capacities of component parts, in a typical arrangement, individual planter hoppers 38 hold about 1⅓ bushels of seed. Receiving bin 24 holds approximately 3 bushels, and feed tank 32 holds about 18 bushels. Optimum dimensional relationships for the parts of the invention are deemed readily apparent and obvious to one skilled in the art, and all equivalent relationships to those illustrated in the drawings and described in the specification are intended to be encompassed by the invention, subject only to limitations specifically appearing in the claims.

Planter 28 is towed by a prime mover, shown in FIG. 1 to be tractor 40, which is connected with a 3-point hitch arrangement including pivot points 42 and 44 and lifters 46. Alternatively, a towed arrangement can be used, in either case, the pull being transmitted to planter 28 by tow bar 48. In a typical arrangement, using beans as the particular seed being planted, auger 22 moves beans from the grain bed of truck 20 into bin 24 at a rate of about 4½ bushels per minute, auger 22 being driven by electric motor 52, powered from truck 20. In this manner, beans are moved smoothly from the grain bed of truck 20 into bin 24, and thence to planter 28. The open, uncompartmented grain bed of truck 20 is relatively simple, being easily fillable with bulk beans so that a user of the invention need not modify his conventional truck 20 to accommodate the invention. Accordingly, truck 20 can be used, not only for loading planter 28, but also for carrying harvested beans to a storage area, such as an elevator.

In FIG. 2, receiving bin 24 is attached to the upper portion of truck 20 by bracket means 54, including gusset plate 56 and bracket arm 58. Gusset 56 and arm 58 are preferably welded to sloping interior wall 60 of bin 24. Wall 60 is preferably constructed of 14-gauge mild steel. Overflow pipe 62 prevents spillage of grain from bin 24 by returning any excess supply to the grain bed of truck 20. Transition pipe 64 is connected through flange 66 to bin 24 and joins swivel housing 68 to enable telescoping feed pipe 26 to rotatively swing freely about a vertical axis centered on swivel housing 68. Feed pipe 26 is made up of two principal sections, namely inside pipe 70, preferably having an outside diameter of about 5 inches and outside pipe 72, preferably having an inside diameter of about 5 1/32 inches. Pipe elbow 74 preferably has a 5-inch outside diameter. Each of pipes 70 and 72 preferably has a length of about 60 inches, with the capability of telescoping approximately 36 inches longitudinally. Pipes 70 and 72, as well as pipe elbow 74 and transition pipe 64 are preferably made of mild steel. Auger 22 is conventional in construction, having blade 76, housing 78 and drive motor 52 attached thereto, motor 52 having wires 80 which, although shown disconnected in FIG. 2, in operation can extend along the outside of receiving bin 24 and thence along the longitudinal extent of feed pipe 26 for connection to motor switch 140 near the lower extent of feed pipe 26 for easy control of auger 22 by an operator.

Additional details of the flange and transition pipe arrangement can be seen in FIGS. 3 through 5. Flange 66 comprises two halves, namely, a lower half 82 and an upper half 84. While lower half 82 is affixed permanently to bin 24, upper half 84 is removable, as is indicated in phantom in FIG. 3 to move upwardly to the position shown as 84'. This then permits disengagement of transition pipe 64 if necessary. Removal of upper portion 84 is accomplished by disconnection at tabs 86, which are joined by wing nuts 88. Adjustment of position is possible with use of adjusting holes 92 and adjusting nut 94. Preferably, adjusting holes 92 provide the potential for approximately 60° of incremental adjustment. In an exemplary embodiment, flange 66 has an outside diameter of 7 9/32 inches, being a 7 inch flange (internal dimension).

Referring now to FIG. 6, feed tank 32 receives material through telescoping feed pipe 26, and then dispenses seed through feed line 36 into individual planter hoppers 38. Feed line 36 is made up of two sections, namely, common segment 100 and terminal segments 102. Terminal segments 102, occurring in pairs, form with common segment 100 a Y-shaped dispensing means, with control of flow being possible with use of flow control gate 104, which is mounted on common segment 100. Although segments 100 and 102 are shown in FIG. 6 as rigid in nature, these segments can be flexible. Terminal segment 102 is preferably attached to hopper 38 by bracket assembly 106, as illustrated in FIG. 8, tightenable on wall 108 of hopper 38 by wing nut 110. Flow control gate 104 is provided with adjustably liftable plate 112, as illustrated in FIGS. 9–11, having upper lip 114 to facilitate manual lifting. Housing 116 guides plate 114 for sliding upwardly and downwardly in order to expose a greater or lesser cross section of segment 100 and permit greater or lesser flow therethrough. Nut 120 is tightenable at a selectable position of plate 112, thereby enabling a selected flow to pass through segment 100. In FIG. 10, the maximum flow possible through segment 100 is represented by the uppermost position of plate 112, shown in phantom as 112', with lip 114' corresponding thereto. Hopper 38 is made up of support 122, receptacle 124, and wheel 126, and is of conventional construction. Feed tank 32 is mounted on frame 128, such as by welding or the like.

Telescoping feed pipe 26 is best seen in FIGS. 7 and 8, where interior pipe 70 is shown in elevation and exterior pipe 72 is shown in longitudinal section. While flow control valve 130 on feed pipe 26 may differ in size from flow control gate 104, due to the relative sizes of pipe 72 and segment 100, the construction can be similar to that shown in FIGS. 9, 10 and 11. Accordingly, corresponding parts have not been numbered in FIG. 7. Hoppers 38 are preferably mounted on supports 134, which are supported by wheels 136.

In operation, loose soybeans, rice, corn, wheat, milo, or other fertilizer or grain seed can be placed in bulk in the truck and augered into receiving bin 24, preferably by activating auger 22 at a remote control station, such as control box or switch 140 located on telescoping feed pipe 26 near gate 130. Telescoping feed pipe 26 then is oriented with gate 130 closed to a position over feed tank 32 and gate 130 is opened. Compartments 32 are filled to a desired level, with gates 104 closed. Upon conclusion of filling of planter 28, telescoping feed pipe 26 is then swung about swivel housing 68 to a location near truck 20, and planter 28 can be towed to a desired location of use. Gates 104 can then be opened to fill hoppers 38 and planting can then proceed in the usual manner.

The invention avoids use of conveyor systems, driving equipment for conveyor systems, such as gasoline engines or the like, and the invention avoids chain or sprocket drive arrangements to force seeds into seeding units. With use of the invention, gravity flow is possible from the receiving bin downwardly, giving a simplicity of operation and construction which avoids unnecessary maintenance expense, minimizes the occurrence of lost time due to malfunctions which can frequently occur with more complex arrangements and reduces capital construction costs as well. Further, the invention is usable with a conventional truck without modification. The invention is usable with a wide variety of grain seeds, including but not being limited to corn, soybeans, wheat, milo, rice, and the like. In addition, granular fertilizer can be dispensed. Accordingly, the general purpose truck can be used for multiple purposes, including not only loading of a planter but for other purposes as well, such as carrying harvested grain to a storage location, such as an elevator.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling withing the scope of the invention.

What is claimed as new is as follows:

1. An agricultural implement for dispensing grain, seeds or fertilizer from a mobile storage receptacle having an open top and upwardly extending sidewalls comprising receiving bin means mountable on one of said sidewalls and having filling means for transferring seed or fertilizer from the receptacle to the receiving bin means, and connecting means for transfer of said seed or fertilizer from the receiving bin means to a planter means, said connecting means comprising a telescoping feed pipe having at least one pipe slidable within a second pipe, whereby the longitudinal extent of the feed pipe is adjustable, the planter means comprising a towable frame on which is mounted a common feed tank for receiving seed or fertilizer from the connecting means, the feed tank having distributing means for transfer of seed or fertilizer to a plurality of individual planter hoppers for dispensing the seed or fertilizer into the ground, said telescoping feed pipe being further swivelable about a swivel housing connected by a transition pipe to the receiving bin, whereby the telescoping feed pipe is movable in a horizontal plane by swivelling about the swivel housing, said filling means comprising a powered auger consisting of a spiral auger blade fittingly rotatable in an auger housing for upward lifting of said seed or fertilizer from the receptacle into the bin, said powered auger being controllable in operation from a location remote from said auger, whereby filling of said bin is facilitated, said location being on the outer pipe of said telescoping feed pipe, said distributing means comprising a Y-shaped feed line having a common segment connected to said common feed tank and a pair of terminal segments connected to the common segment and located between the common segment and a pair of the plurality of plant hoppers, whereby gravity flow of seed or fertilizer from said common feed tank to the hopper is facilitated, and further wherein said telescoping feed pipe is provided with a feed pipe flow control gate, whereby the rate of flow of seed or fertilizer therethrough into the feed tank is adjustably controllable.

2. The implement of claim 1 wherein said feed line is provided with a feed line flow control gate in the common segment thereof, whereby an adjustable control of a flow of seed through the feed line is permitted during planting operations.

3. The implement of claim 2 wherein said towable frame is connected by a 3-point hitch to a towing vehicle.

4. The implement of claim 3 wherein said feed pipe flow control gate comprises a liftable plate insertable transversely to the longitudinal extent of said outer pipe of the telescoping feed pipe, said plate being guidingly mounted on the pipe by a gate housing mounted on the pipe, the gate housing including fastening means for adjustably securing the plate at a selectable position within the housing, the plate having attached at the upper end thereof a lifting lip to facilitate manual lifting thereof.

5. An agricultural implement for dispensing grain, seeds or fertilizer from a mobile storage receptacle having an open top and upwardly extending side walls, comprising receiving bin means mountable on one of said side walls and having filling means for transferring seed or fertilizer from the receptacle to the receiving bin means, planter means, and connecting means for transfer of said seed or fertilizer from the receiving bin means to the planter means, the planter means comprising a towable frame on which is mounted a common feed tank for receiving seed or fertilizer from the connecting means, the feed tank having distributing means for transfer of seed or fertilizer to a plurality of individual planter hoppers for dispensing the seed or fertilizer into the ground, said connecting means comprising a telescoping feed pipe having an interior pipe slidable within an exterior pipe, whereby the longitudinal extent of the feed pipe is adjustable, the telescoping feed pipe being swivelable about a swivel housing connected by a transition pipe to the receiving bin, whereby the telescoping feed line is movable in a horizontal plane by swiveling about the swivel housing, said filling means comprising a powered auger consisting of a spiral auger blade fittingly rotatable in an auger housing for upward lifting of said seed or fertilizer from the receptacle into the bin means, said powered auger being controllable in operation from a location remote from said auger, whereby filling of said bin is facilitated, said location being on the outer pipe of the telescoping feed pipe, said distributing means comprising a Y-shaped feed line having a common segment connected to said common feed tank and a pair of terminal segments connected to the common segment and located between the common segment and a pair of the plurality of planter hoppers, whereby gravity flow of seed or fertilizer from said common feed tank to the hoppers is facilitated, said telescoping feed pipe being provided with a feed pipe flow control gate, whereby the rate of flow of seed of fertilizer therethrough into the feed tank is adjustably controllable, said Y-shaped feed line being provided with a feed line control gate in the common segment thereof, whereby control of a flow of seed through the Y-shaped feed line can be adjustably controlled during planting operations, said towable frame being connected by a 3-point hitch to a towing vehicle, said feed pipe flow control gate in said telescoping feed pipe comprising a liftable plate insertable transversely to the longitudinal extent of said outer pipe of the telescoping feed pipe, said plate being guidingly mounted on the pipe by a gate housing mounted on the pipe, the gate housing including fastening means for adjustably securing the plate at a selectible position within the housing, the plate having attached at an upper end thereof a lifting lip to facilitate manual lifting thereof, said transition pipe being connected to said receiving bin means by a mounting flange attached to the receiving bin means, the flange having a throat mounted near a lowermost portion of the bin means, whereby transfer of seed or fertilizer from the bin means through the flange and into the telescoping feed pipe is facilitated.

6. The implement of claim 5 wherein said flange comprises an upper flange half and a lower flange half, the upper and lower flange halves being securable together by securing means, the lower flange half being affixed to the receiving bin means, and the upper half being re-movable from said bin means, whereby disconnection of the telescoping feed pipe from the receiving bin means is facilitated.

7. The implement of claim 6 wherein said flange is provided with adjusting holes, whereby the angular orientation of said transition pipe with respect to said receiving bin means is adjustable.

8. The implement of claim 7 wherein said adjusting holes provide approximately 60° of potential adjustment.

9. The implement of claim 8 wherein said receiving bin means is attachable to said receptacle by a receiving bin bracket comprising a gusset for support of the receiving bin means against an exterior portion of said side walls and a bracket portion for support of the receiving bin means along top and inside surfaces of the side walls.

* * * * *